United States Patent
Ham et al.

(10) Patent No.: US 11,101,073 B2
(45) Date of Patent: Aug. 24, 2021

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-si (KR)

(72) Inventors: Tae Young Ham, Suwon-si (KR); Hyoung Uk Kim, Suwon-si (KR); Kyoung Jin Cha, Suwon-si (KR); Min Young Choi, Suwon-si (KR); Ji Hong Jo, Suwon-si (KR); Seung In Baik, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 56 days.

(21) Appl. No.: 16/400,706

(22) Filed: May 1, 2019

(65) Prior Publication Data
US 2020/0258685 A1    Aug. 13, 2020

(30) Foreign Application Priority Data
Feb. 13, 2019 (KR) .................. 10-2019-0016745

(51) Int. Cl.
| | |
|---|---|
| *H01G 4/12* | (2006.01) |
| *C04B 35/468* | (2006.01) |
| *H01G 4/005* | (2006.01) |
| *H01G 4/30* | (2006.01) |

(52) U.S. Cl.
CPC ....... *H01G 4/1227* (2013.01); *C04B 35/4682* (2013.01); *H01G 4/005* (2013.01); *H01G 4/30* (2013.01)

(58) Field of Classification Search
CPC .......................... C04B 35/4682; H01G 4/1227
See application file for complete search history.

(56) References Cited

U.S. PATENT DOCUMENTS

| | | | | |
|---|---|---|---|---|
| 6,380,116 B1 * | 4/2002 | Okamatsu | ........... | C04B 35/4682 361/321.4 |
| 7,759,269 B2 * | 7/2010 | Takahashi | .............. | B82Y 30/00 501/138 |
| 9,928,960 B2 * | 3/2018 | Nakanishi | ................ | H01G 4/01 |

(Continued)

FOREIGN PATENT DOCUMENTS

| | | | | |
|---|---|---|---|---|
| EP | 1346965 A1 * | 9/2003 | ......... | C04B 35/4682 |
| JP | 11322416 A * | 11/1999 | | |

(Continued)

OTHER PUBLICATIONS

Office Action issued in corresponding Korean Patent Application No. 10-2019-0016745 dated May 12, 2020, with English abstract.

*Primary Examiner* — Karl E Group
(74) *Attorney, Agent, or Firm* — Morgan, Lewis & Bockius LLP

(57) ABSTRACT

A dielectric ceramic composition includes a barium titanate-based base material main ingredient and an accessory ingredient, and the accessory ingredient includes dysprosium (Dy) and gadolinium (Gd) as first accessory ingredient elements, and a content ratio of gadolinium (Gd), based on a total content of the first accessory ingredient elements, is 25% or higher.

11 Claims, 2 Drawing Sheets

(56) References Cited

U.S. PATENT DOCUMENTS

| | | | |
|---|---|---|---|
| 2002/0039272 A1* | 4/2002 | Mizuno | H01G 4/232 |
| | | | 361/311 |
| 2008/0305944 A1* | 12/2008 | Ueda | H01G 4/1227 |
| | | | 501/137 |
| 2009/0086407 A1* | 4/2009 | Takahashi | H01G 4/1227 |
| | | | 361/321.5 |
| 2014/0285950 A1 | 9/2014 | Morita et al. | |
| 2015/0287535 A1* | 10/2015 | Nakanishi | H01G 4/1245 |
| | | | 361/301.4 |
| 2016/0307701 A1 | 10/2016 | Park et al. | |

FOREIGN PATENT DOCUMENTS

| | | | | |
|---|---|---|---|---|
| JP | 2002-87880 | A | | 3/2002 |
| JP | 2009184841 | A * | | 8/2009 |
| JP | 2011-256091 | A | | 12/2011 |
| KR | 10-1999-0075846 | A | | 10/1999 |
| KR | 10-2014-0041324 | A | | 4/2014 |
| KR | 10-2016-0123645 | A | | 10/2016 |
| WO | WO-2009041160 | A1 * | 4/2009 | C04B 35/4682 |

\* cited by examiner

I-I'

DIELECTRIC CERAMIC COMPOSITION AND MULTILAYER CERAMIC CAPACITOR COMPRISING THE SAME

CROSS-REFERENCE TO RELATED APPLICATION(S)

This application claims benefit of priority to Korean Patent Application No. 10-2019-0016745 filed on Feb. 13, 2019 in the Korean Intellectual Property Office, the disclosure of which is incorporated herein by reference in its entirety.

BACKGROUND

The present disclosure relates to a dielectric ceramic composition and a multilayer ceramic capacitor comprising the same which may improve reliability.

Generally, electronic components using ceramic materials such as capacitors, inductors, piezoelectric devices, varistors, thermistors, or the like, may include a ceramic body formed of a ceramic material, internal electrodes disposed in the body, and external electrodes disposed on a surface of the ceramic body and connected to the internal electrodes.

Recently, while electronic products have been designed to have reduced sizes and multiple functions, chip components have also been reduced in size and have had a variety of functions implemented therein. Accordingly, there has been demand for a multilayer ceramic capacitor having a reduced size and high capacitance.

To implement a multilayer ceramic capacitor having a reduced size and high capacitance, thicknesses of internal dielectric layers and electrode layers may need to be reduced such that an increased number of the internal dielectric layers and electrode layers may be layered. Generally, a thickness of a dielectric layer is around 0.6 μm, and techniques to further decease a thickness of a dielectric layer have continuously been developed.

To reduce the thickness of a dielectric layer, however, there has been an issue of securing breakdown voltage properties in relation to a dielectric material. Further, as the defect of degradation in insulation resistance of a dielectric material has increased, there have been difficulties in managing product quality and yield.

To address the issue above, it has been necessary to secure high reliability in relation to a structural aspect of a multilayer ceramic capacitor and also a compositional aspect of a dielectric material.

If a dielectric composition which may improve breakdown voltage properties and reliability is secured, a size of a multilayer ceramic capacitor may be reduced further than before.

SUMMARY

An aspect of the present disclosure is to provide a dielectric ceramic composition and a multilayer ceramic capacitor comprising the same which may improve reliability.

According to an aspect of the present disclosure, a dielectric ceramic composition includes a barium titanate ($TiBaO_3$)-based base material main ingredient and an accessory ingredient. The accessory ingredient may include first, second, third, fourth, fifth and sixth accessory ingredients. The accessory ingredient includes dysprosium (Dy) and gadolinium (Gd) as first accessory ingredient elements, and a content ratio of gadolinium (Gd), based on a total content of the first accessory ingredient elements, is 25 mol % or higher. The total content of the first accessory ingredient elements based on a based on 100 mol % of barium titanate is 0.1 mol % to 10 mol %. In some embodiments, the total content of the first accessory ingredient elements based on a based on 100 mol % of barium titanate is 1 mol % to 5 mol %. In some embodiment, the total content of the first accessory ingredient elements based on a based on 100 mol % of barium titanate is 1.5 mol %. In some embodiments, a total content of Gd based on 100 mol % of the base material main ingredient may be less than 2.0 mol %.

According to an aspect of the present disclosure, a multilayer ceramic capacitor includes a ceramic body including a dielectric layer, and a first internal electrode and a second internal electrode opposing each other with the dielectric layer interposed therebetween; and a first external electrode disposed on an external side of the ceramic body and electrically connected to the first internal electrode, and a second external electrode disposed on an external side of the ceramic body and electrically connected to the second internal electrode. The dielectric layer includes a dielectric ceramic composition, and the dielectric ceramic composition includes a barium titanate-based base material main ingredient and an accessory ingredient, and the accessory ingredient includes dysprosium (Dy) and gadolinium (Gd) as first accessory ingredient elements, and a content ratio of gadolinium (Gd), based on a total content of the first accessory ingredient elements, is 25 mol % or higher. In some embodiments, a total content of Dy based on 100 mol % of the base material main ingredient may be less than 4.0 mol %.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
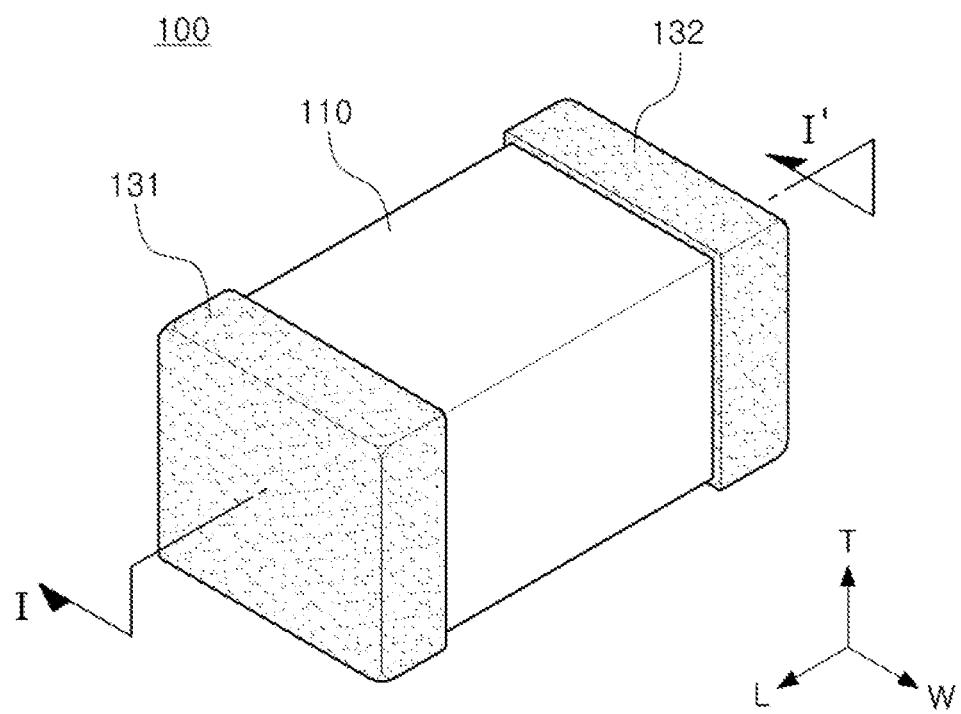
FIG. 1 is a schematic perspective diagram illustrating a multilayer ceramic capacitor according to an example embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

FIG. 1 is a schematic perspective diagram illustrating a multilayer ceramic capacitor according to an example embodiment.

Figure 2:
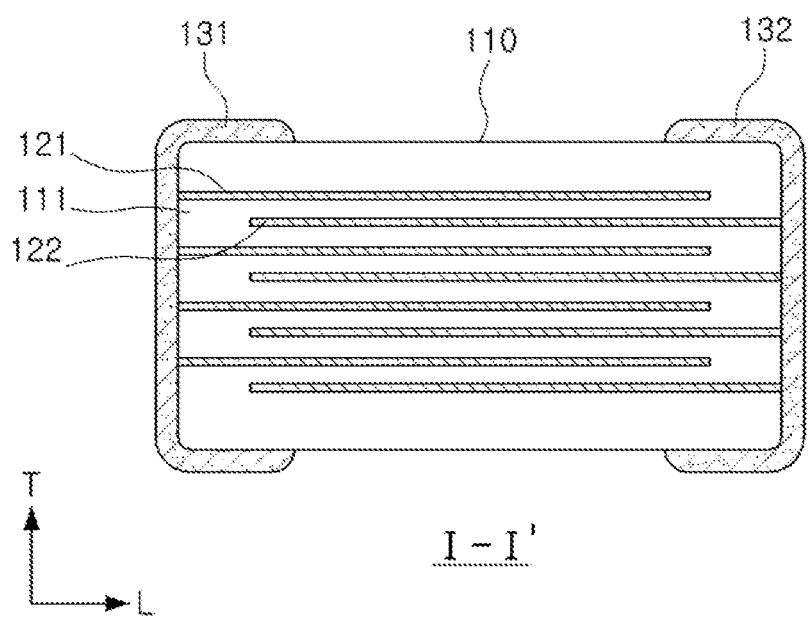
FIG. 2 is a cross-sectional diagram taken along line I-I' in FIG. 1.
Figure 3A:
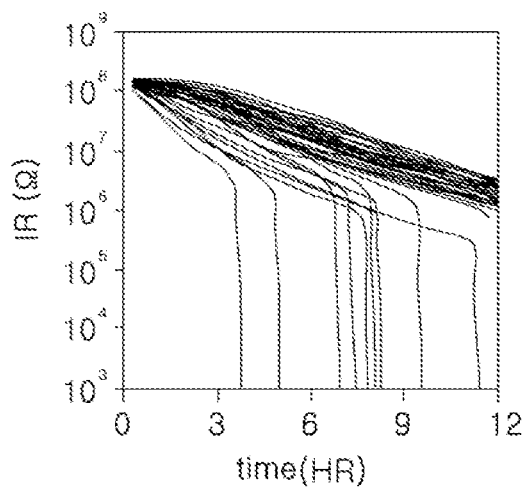
FIGS. 3A to 3D are a graph illustrating results of a highly accelerated life test of an embodiment and a comparative example.
Figure 3B:
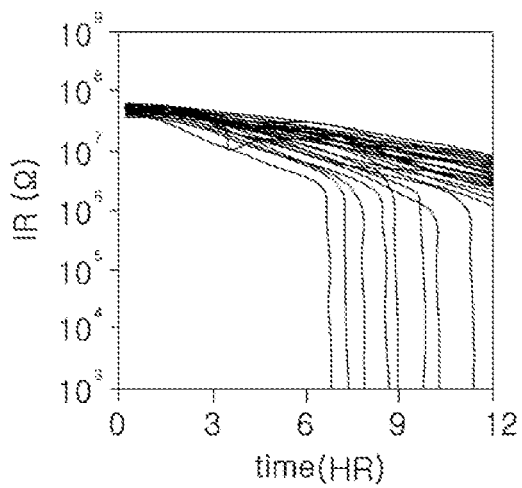
Figure 3C:
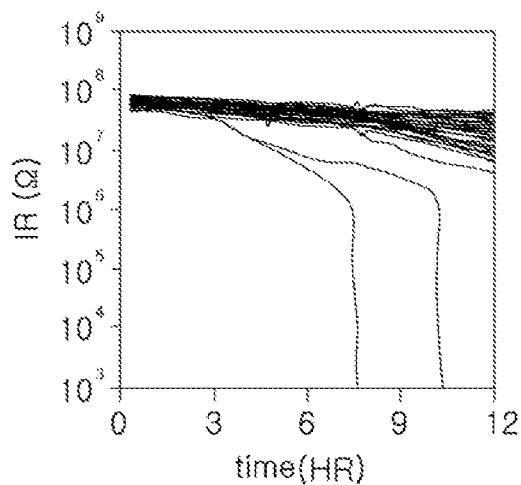
Figure 3D:
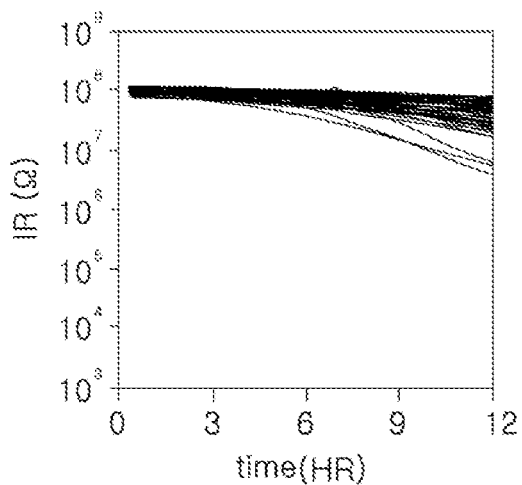

FIG. 2 is a cross-sectional diagram taken along line I-I' in FIG. 1.

Referring to FIGS. 1 to 2, a multilayer ceramic capacitor 100 in the example embodiment may include a ceramic body 110 including a dielectric layer 111, and a first internal electrode 121 and a second internal electrode 122 opposing each other with the dielectric layer 111 interposed therebetween, and a first external electrode 131 disposed externally of the ceramic body 110 and electrically connected to the first internal electrode 121, and a second external electrode 132 disposed externally of the ceramic body 110 and electrically connected to the second internal electrode 122.

In the multilayer ceramic capacitor 100 in the example embodiment, "a length direction" is an L direction, "a width direction" is a W direction, and "a thickness direction" is a T direction, illustrated in FIG. 1. The thickness direction may be the same as a layering direction in which the dielectric layers are layered.

A shape of the ceramic body 110 is not limited to any particular shape. For example, the ceramic body 110 may have a rectangular parallelepiped shape.

The plurality of internal electrodes 121 and 122 disposed in the ceramic body 110 may be configured such that one ends of the plurality of internal electrodes 121 and 122 may be exposed to one surface of the ceramic body 110 or to the other surface opposing one surface of the ceramic body 110.

With regard to the internal electrodes 121 and 122, the first internal electrode 121 and the second internal electrode 122 having different polarities may be configured to be one pair.

One end of the first internal electrode 121 may be exposed to one surface of the ceramic body, and one end of the second internal electrode 122 may be exposed to the other surface opposing the one surface.

The first and second external electrodes 131 and 132 may be disposed on one surface of the ceramic body 110 and on the other surface opposing the one surface, and may be electrically connected to the internal electrodes.

A material forming the first and second internal electrodes 121 and 122 is not limited to any particular material.

For example, a material of the first and second internal electrodes 121 and 122 may be formed using a conductive paste including one or more elements among silver (Ag), lead (Pb), platinum (Pt), nickel (Ni), and copper (Cu).

The first and second external electrodes 131 and 132 may be electrically connected to the first and second internal electrodes 121 and 122 to form capacitance, and the second external electrode 132 may be connected to a potential different from a potential of the first external electrode 131.

A conductive material included in the first and second external electrodes 131 and 132 is not limited to any particular material. For example, nickel (Ni), copper (Cu), or alloys thereof may be used as the conductive material.

Thicknesses of the first and second external electrodes 131 and 132 are not limited to any particular sizes. For example, the thicknesses may be within a range of 10 μm to 50 μm.

According to the example embodiment, a material of the dielectric layer 111 is not limited to any particular material as long as sufficient capacitance is able to be obtained. For example, the material may be a barium titanate ($BaTiO_3$) powder.

As a material of the dielectric layer 111, various additives, organic solvents, plasticizers, coupling agents, dispersing agents, and the like, may be added to a barium titanate ($BaTiO_3$) powder depending on an intended purpose. In some embodiments, the additives are the rare earth elements included in the dielectric ceramic composition. In some embodiments, the content of the rare earth elements are a total amount of the first, second, third, fourth, fifth and sixth accessory ingredient elements included in the dielectric ceramic composition.

The dielectric layer 111 may be in a sintered state, and the dielectric layers 111 may be integrated with each other such that it may be difficult to identify boundaries between adjacent dielectric layers 111.

The first and second internal electrodes 121 and 122 may be formed on the dielectric layer 111, and the internal electrodes 121 and 122 may be formed in the ceramic body with a single dielectric layer interposed therebetween through a sintering process.

A thickness of the dielectric layer 111 may vary in accordance with a capacitance design of a capacitor. In the example embodiment, a thickness of the single dielectric layer after a sintering process may be 0.4 μm or less preferably.

Thicknesses of the single first internal electrode 121 and the single second internal electrode 122 each after a sintering process may be 0.4 μm or less.

According to the example embodiments, the dielectric layer 111 may include a dielectric ceramic composition. The dielectric ceramic composition may include a barium titanate ($BaTiO_3$)-based base material main ingredient and an accessory ingredient. The accessory ingredient may include dysprosium (Dy) and gadolinium (Gd) as first accessory ingredient elements, and a content ratio of gadolinium (Gd), based on a total content of the first accessory ingredient elements, may be 25% or higher.

Generally, a large amount of rare earth elements may be added to secure reliability of a dielectric material provided in a multilayer ceramic capacitor.

Rare earth elements may work as a donor to form a shell region by substituting for an A-site of barium titanate ($BaTiO_3$), a base material main ingredient, and reducing concentration of oxygen vacancies. Rare earth elements may also work as a barrier for blocking a flow of electrons in grain boundaries to prevent an increase in leakage current.

Dysprosium (Dy) may be one of representative rare earth elements. In the example embodiment, gadolinium (Gd) having a greater ion radius as compared to that of dysprosium (Dy) may be added to effectively improve reliability.

As gadolinium (Gd) has a greater ion radius than an ion radius of dysprosium (Dy), gadolinium (Gd) may substitute for Ba-site more effectively, and accordingly, gadolinium (Gd) may have a more effective donor tendency than dysprosium (Dy).

If gadolinium (Gd) is added as above, concentration of oxygen vacancy may decrease effectively, and gadolinium (Gd) may work as a leakage current barrier. Thus, in the example embodiment, gadolinium (Gd) may be added.

Generally, gadolinium (Gd) may be added to a dielectric ceramic composition as rare earth elements in addition to dysprosium (Dy).

Also, roles of elements added to improve reliability in relation to designing a dielectric composition have been well known.

As described above, it has been known that rare earth elements, such as dysprosium (Dy), may reduce concentration of oxygen vacancy by substituting for A-site of barium titanate ($BaTiO_3$), and may work as a barrier in grain boundaries such that reliability may improve. Also, it has been known that when gadolinium (Gd) is added, reliability may further improve than when dysprosium (Dy) is added.

However, in the related art, gadolinium (Gd) is simply listed as a rare earth element, or only a small amount of gadolinium (Gd) is added without recognizing the above described effect of gadolinium (Gd). Further, a content of gadolinium (Gd) added to improve reliability is not specified.

The example embodiment of the present disclosure may suggest an appropriate content ratio of dysprosium (Dy) to gadolinium (Gd) such that reliability may improve.

According to the example embodiment, the dielectric ceramic composition may include a base material main ingredient and an accessory ingredient. The accessory ingredient may include dysprosium (Dy) and gadolinium (Gd) as first accessory ingredient elements, and a content ratio of gadolinium (Gd), based on a total content of the first accessory ingredient elements, may be 25% or higher.

By adjusting a content ratio of gadolinium (Gd), based on a total content of the first accessory ingredient elements, to be 25% or higher, breakdown voltage properties, insulating resistance, and the like, may improve such that overall reliability may improve.

When a content ratio of gadolinium (Gd), based on a total content of the first accessory ingredient elements, is less than 25%, a content of gadolinium (Gd) may be relatively low, and the dielectric ceramic composition may be similar to a general dielectric ceramic composition such that there may be no significant improvement in reliability including breakdown voltage properties, insulating resistance, and the like.

In the example embodiment, a content ratio of gadolinium (Gd), based on a total content of the first accessory ingredient elements, may be 50% or higher.

When a content ratio of gadolinium (Gd), based on a total content of the first accessory ingredient elements, is 50% or higher, a defect rate may decrease four times lower than a general dielectric ceramic composition, and thus, reliability may improve effectively.

The dielectric ceramic composition may include dysprosium (Dy) and gadolinium (Gd) as first accessory ingredient elements, and may further include 0.001 mol % to 4.0 mol % of oxides or carbonates including at least one element among Y, Ho, Er, Ce, Nd, Pm, Eu, Tb, Tm, Yb, Lu and Sm as the first accessory ingredient elements, based on 100 mol % of the base material main ingredient. In some embodiments, the dielectric ceramic composition may include 0.001 mol % of the first accessory ingredient.

According to example embodiments, the dielectric ceramic composition included in a dielectric layer in a ceramic body may include gadolinium (Gd), a new rare earth element, as an accessory ingredient, and a content of gadolinium (Gd) compared to a content of dysprosium (Dy) may be controlled such that reliability including breakdown voltage properties, insulating resistance, and the like, may improve.

According to example embodiments, a content of gadolinium (Gd) may be equal to or higher than a content of (Dy) in the dielectric ceramic composition. Therefore, in one embodiment, a content molar ratio of gadolinium (Gd) to dysprosium (Dy), Gd/Dy, may be 100% (1 to 1) or higher.

By controlling a content ratio of gadolinium (Gd) to dysprosium (Dy), Gd/Dy, to be 100% or higher, reliability including breakdown voltage properties, insulating resistance, and the like, may improve.

When a content ratio of gadolinium (Gd) to dysprosium (Dy), Gd/Dy, is 100% or higher, a defect rate may significantly decrease in a highly accelerated life test.

When a content ratio of gadolinium (Gd) to dysprosium (Dy), Gd/Dy, is less than 100%, particularly less than 50%, a defect rate may increase in a highly accelerated life test, and when a content ratio of gadolinium (Gd) to dysprosium (Dy), Gd/Dy, is 0, that is, when gadolinium (Gd) is not added as in the related art, a defect rate may increase in a highly accelerated life test.

The multilayer ceramic capacitor 100 in the example embodiment may be a micro-size product having high capacitance as described above, and a thickness of the dielectric layer 111 may be 0.4 μm or less, and thicknesses of the first and second internal electrodes 121 and 122 may be 0.4 μm or less. However, example embodiments thereof are not limited thereto.

Thus, as the multilayer ceramic capacitor 100 is a micro-size product having high capacitance, the dielectric layer 111 and the first and second internal electrodes 121 and 122 may be configured to be thin films having thicknesses less than thicknesses of general dielectric layers and electrodes. In a product in which such dielectric layers and internal electrodes configured as thin films are applied, the improvement of reliability including breakdown voltage properties, insulating resistance, and the like, may be an important issue.

In a general multilayer ceramic capacitor, as thicknesses of dielectric layers and internal electrodes are relatively greater than thicknesses of the dielectric layers and the internal electrodes included in the multilayer ceramic capacitor in the example embodiment, even when the composition of a dielectric ceramic composition material is the same as that of a generally used dielectric ceramic composition material, reliability has not been an issue.

However, reliability of a multilayer ceramic capacitor may be important for the product in which dielectric layers and internal electrodes are employed as in the example embodiment, and to this end, the composition of a dielectric ceramic composition material may need to be controlled.

By controlling a content ratio of gadolinium (Gd), based on a total content of the first accessory ingredient elements, to be 25% or higher, even when thicknesses of the dielectric layer 111 and the first and second internal electrodes 121 and 122 are configured as thin films, having thicknesses of 0.4 μm or less, reliability including breakdown voltage properties, insulating resistance, and the like, may improve.

However, the notion that the dielectric layer 111 and the first and second internal electrodes 121 and 122 are configured as thin film does not necessary indicate that thicknesses of the dielectric layer 111 and the first and second internal electrodes 121 and 122 are limited to 0.4 μm or less. The dielectric layer 111 and the first and second internal electrodes 121 and 122 may be implemented as dielectric layers and internal electrodes having thicknesses less than thicknesses of general dielectric layers and internal electrodes.

In the description below, ingredients of the dielectric ceramic composition will be described in greater detail in accordance with an example embodiment.

a) Base Material Main Ingredient

A dielectric ceramic composition in the example embodiment may include a base material main ingredient represented by $BaTiO_3$.

According to an example embodiment, the base material main ingredient may include one or more elements selected from a group consisting of $BaTiO_3$, $(Ba_{1-x}Ca_x)(Ti_{1-y}Ca_y)O_3$ (x may satisfy $0 \leq x \leq 0.3$, and y may satisfy $0 \leq y \leq 0.1$), $(Ba_{1-x}Ca_x)(Ti_{1-y}Zr_y)O_3$ (X may satisfy $0 \leq x \leq 0.3$, and y may satisfy $0 \leq y \leq 0.5$), and $Ba(Ti_{1-y}Zr_y)O_3$ (y may satisfy $0 < y \leq 0.5$), but an example embodiment thereof is not limited thereto.

The dielectric ceramic composition may have a dielectric constant of 2000 or higher at room temperature in the example embodiment.

The base material main ingredient is not limited to any particular example, and an average particle size of a main ingredient powder may be 40 nm or greater and 150 nm or less.

b) First Accessory Ingredient

According to an example embodiment, the dielectric ceramic composition may include dysprosium (Dy) and gadolinium (Gd) as first accessory ingredient elements, and may further include 0.0 to 4.0 mol % of a first accessory ingredient comprising oxides or carbonates including at least one element among Y, Ho, Er, Ce, Nd, Pm, Eu, Tb, Tm, Yb, Lu and Sm, based on 100 mol % of the base material main ingredient. The oxides as the first accessory ingredient elements, for example, include dysprosium oxide ($Dy_2O_3$), gadolinium oxide ($Gd_2O_3$), yttrium oxide ($Y_2O_3$), holmium oxide ($HO_2O_3$), erbium oxide ($Er_2O_3$), cerium oxide ($CeO_2$), neodymium oxide ($Nd_2O_3$), promethium oxide ($Pm_2O_3$), europium oxide ($Eu_2O_3$), terbium oxide ($Tb_4O_7$), thulium oxide ($Tm_2O_3$), ytterbium oxide ($Yb_2O_3$), lutetium oxide ($Lu_2O_3$), and samarium oxide ($Sm_2O_3$). The carbonates as the first accessory ingredient elements, for example, include dysprosium carbonate $Dy_2(CO_3)_3$, gadolinium carbonate $Gd_2(CO_3)_3$, yttrium carbonate $Y_2(CO_3)_3$, holmium carbonate $Ho_2(CO_3)_3$, erbium carbonate $Er_2(CO_3)_3$, cerium carbonate $Ce_2(CO_3)_3$, neodymium carbonate $Nd_2(CO_3)_3$, promethium carbonate $Pm_2(CO_3)_3$, europium carbonate $Eu(CO_3)_3$, terbium carbonate $Tb_2(CO_3)_3$, thulium carbonate $Tm_2(CO_3)_3$, ytterbium carbonate $Yb_2(CO_3)_3$, lutetium carbonate $Lu_2(CO_3)_3$, and samarium carbonate $Sm_2(CO_3)_3$.

The first accessory ingredient may prevent degradation of reliability of a multilayer ceramic capacitor in which the dielectric ceramic composition is applied in the example embodiment.

When a content of the first accessory ingredient exceeds 4.0 mol %, reliability may degrade, or a dielectric constant of the dielectric ceramic composition may decrease, and high temperature breakdown voltage properties may degrade.

A content ratio of gadolinium (Gd), based on a total content of the first accessory ingredient elements, may be 25% or higher.

By controlling a content ratio of gadolinium (Gd), based on a total content of the first accessory ingredient elements, to be 25% or higher, reliability including breakdown voltage properties, insulating resistance, and the like, may improve.

When a content ratio of gadolinium (Gd), based on a total content of the first accessory ingredient elements, is less than 25%, a content of gadolinium (Gd) may be relatively low, and the dielectric ceramic composition may be similar to a general dielectric ceramic composition. Thus, there may be no significant improvement in reliability including breakdown voltage properties, insulating resistance, and the like.

According to an example embodiment, a content ratio of gadolinium (Gd), based on a total content of the first accessory ingredient elements, may be 50% or higher.

When a content ratio of gadolinium (Gd), based on a total content of the first accessory ingredient elements, is 50% or higher, a defect rate may decrease four times lower than a general dielectric ceramic composition, and thus, reliability may improve effectively.

According to an example embodiment, a content ratio of gadolinium (Gd) to dysprosium (Dy), Gd/Dy, may be 100% or higher.

By controlling a content ratio of gadolinium (Gd) to dysprosium (Dy), Gd/Dy, to be 100% or higher, reliability including breakdown voltage properties, insulating resistance, and the like, may improve.

When a content ratio of gadolinium (Gd) to dysprosium (Dy), Gd/Dy, is 100% or higher, that is, when a content of gadolinium (Gd) is equal to or higher than a content of dysprosium (Dy), a defect rate may significantly decrease in a highly accelerated life test.

When a content ratio of gadolinium (Gd) to dysprosium (Dy), Gd/Dy, is less than 100%, particularly less than 50%, a defect rate may increase in a highly accelerated life test, and when a content ratio of gadolinium (Gd) to dysprosium (Dy), Gd/Dy, is 0, that is, when gadolinium (Gd) is not added as in the related art, a defect rate may increase in a highly accelerated life test.

In the example embodiment, when a total content of added rare earth elements is 1.5 mol % based on 100 mol % of barium titanate, and when a content of added gadolinium (Gd) is 0.75 mol % or higher, the effect of improvement in reliability may increase four times higher than the related art.

c) Second Accessory Ingredient

According to an example embodiment, the dielectric ceramic composition may include oxides or carbonates including at least one or elements among Mn, V, Cr, Fe, Ni, Co, Cu and Zn as a second accessory ingredient. The oxides as the second accessory ingredient elements, for example, include manganese oxide ($MnO_2$), vanadium(II) oxide (VG), vanadium(III) oxide ($V_2O_3$), vanadium(IV) oxide ($VO_2$), vanadium(V) oxide ($V_2O_5$), chromium(II) oxide (CrO), chromium(III) oxide ($Cr_2O_3$), chromium dioxide ($CrO_2$), chromium trioxide ($CrO_3$), iron(II) oxide (FeO), iron (II,III) oxide ($Fe_3O_4$), iron (III) oxide ($Fe_2O_3$), nickel (II) oxide (NiO), nickel (III) oxide ($Ni_2O_3$), cobalt(II) oxide (CoO), cobalt(III) oxide ($Co_2O_3$), cobalt(II,III) oxide ($Co_3O_4$), copper(I) oxide ($Cu_2O$), copper(II) oxide (CuO), copper peroxide ($CuO_2$), copper(III) oxide ($Cu_2O_3$), and zinc oxide (ZnO). The carbonates as the second accessory ingredient elements, for example, include manganese (II) carbonate ($MnCO_3$), vanadium(IV) carbonate ($V(CO_3)_2$), chromium(III) carbonate ($Cr_2(CO_3)_3$), iron(II) carbonate ($FeCO_3$), nickel(II) carbonate($NiCO_3$), cobalt carbonate ($CoCO_3$), copper(II) carbonate, ($CuCO_3$), and zinc carbonate ($ZnCO_3$).

A content of oxides or carbonates including at least one or elements among Mn, V, Cr, Fe, Ni, Co, Cu and Zn as a second accessory ingredient may be 0.1 to 2.0 mol % based on 100 mol % of the base material main ingredient.

The second accessory ingredient may serve to reduce a sintering temperature and improving high temperature breakdown voltage properties of the multilayer ceramic capacitor in which the dielectric ceramic composition is applied.

A content of the second accessory ingredient and contents of third to sixth accessory ingredients may be based on 100 mol % of the base material powder, and may be defined as a mol % of a metal ion included in each of the accessory ingredients.

When a content of the second accessory ingredient is less than 0.1 mol %, a sintering temperature may increase, and high temperature breakdown voltage properties may degrade.

When a content of the second accessory ingredient is 2.0 mol % or higher, high temperature breakdown voltage properties and room temperature resistivity may degrade.

The dielectric ceramic composition in the example embodiment may include 0.1 to 2.0 mol % of the second accessory ingredient based on 100 mol % of the base material main ingredient, and accordingly, a low temperature sintering process may be performed, and high temperature breakdown voltage properties may be obtained.

d) Third Accessory Ingredient

According to an example embodiment, the dielectric ceramic composition may include a third accessory ingredient, oxides or carbonates in which atoms include Mg, a fixed-valence acceptor element.

The dielectric ceramic composition may include 0.0 to 0.5 mol % of the third accessory ingredient, oxides or carbonates in which atoms include Mg, a fixed-valence acceptor element, based on 100 mol % of the base material main ingredient. In some embodiments, the dielectric ceramic composition may include 0.001 mol % of the third accessory ingredient.

The third accessory ingredient may be compounds in which atoms are fixed-valence acceptor elements or include a fixed-valence acceptor element, and the third accessory ingredient may adjust a microstructure (preventing abnormal grain growth) and may endow the dielectric ceramic composition with non-reducible properties.

When a content of the third accessory ingredient, based on 100 mol % of the base material main ingredient, exceeds 0.5 mol %, a dielectric constant may decrease.

According to the example embodiment, in the dielectric ceramic composition, atoms include Mg, a fixed-valence acceptor element, in content of 0.5 mol % or less, and accordingly, grain growth may be uniformly controlled such that breakdown voltage properties and reliability may improve, and DC-bias properties may also improve.

e) Fourth Accessory Ingredient

According to an example embodiment, the dielectric ceramic composition may include a fourth accessory ingredient, oxides or carbonates including Ba.

The dielectric ceramic composition may include 0.0 to 4.15 mol % of the fourth accessory ingredient, oxides or carbonates including Ba, based on 100 mol % of the base material main ingredient. In some embodiments, the dielectric ceramic composition may include 0.001 mol % of the fourth accessory ingredient.

A content of the fourth accessory ingredient may be based on a content of Ba element included in the fourth accessory ingredient without distinguishing a form of addition such as oxides or carbonates.

The fourth accessory ingredient may serve to facilitate a sintering process, to adjust a dielectric constant, and the like, in the dielectric ceramic composition, and when a content of the fourth accessory ingredient exceeds 4.15 mol % based on 100 mol % of the base material main ingredient, a dielectric constant may decrease or a sintering temperature may increase.

f) Fifth Accessory Ingredient

According to an example embodiment, the dielectric ceramic composition may include a fifth accessory ingredient including one or more elements selected from a group consisting of oxides or carbonates including one or more elements between Ca and Zr. The oxides as the fifth accessory ingredient elements include, for example, calcium oxide (CaO) and zirconium oxide ($ZrO_2$). The carbonates as the fifth accessory ingredients elements includes, for example, calcium carbonate ($CaCO_3$) and zirconium carbonate ($Zr(CO_3)_2$).

The dielectric ceramic composition may include the 0.0 to 20.0 mol % of the fifth accessory ingredient, oxides or carbonates including at least one between Ca and Zr, based on 100 mol % of the base material main ingredient. In some embodiments, the dielectric ceramic composition may include 0.001 mol % of the third accessory ingredient.

A content of the fifth accessory ingredient may be based on a content of at least one or more elements between Ca and Zr included in the fifth accessory ingredient without distinguishing a form of addition such as oxides or carbonates.

The fifth accessory ingredient may form a core-shell structure in the dielectric ceramic composition and may serve to improve a dielectric constant and reliability. When the fifth accessory ingredient is included in 20.0 mol % or less based on 100 mol % of the base material main ingredient, the dielectric ceramic composition implementing a relatively high dielectric constant and having improved high temperature breakdown voltage properties may be provided.

When a content of the fifth accessory ingredient exceeds 20.0 mol % based on 100 mol % of the base material main ingredient, a room temperature dielectric constant may decrease, and high temperature breakdown voltage properties may degrade.

g) Sixth Accessory Ingredient

According to an example embodiment, the dielectric ceramic composition may include oxides including at least one element between Si and Al, or glass compounds including Si as a sixth accessory ingredient. The oxides as the sixth accessory ingredient elements include, for example, silicon dioxide ($SiO_2$) and aluminum oxide ($Al_2O_3$).

The dielectric ceramic composition may further include 0.0 to 4.0 mol % of the sixth accessory ingredient, oxides including at least one element between Si and Al, or glass compounds including Si, based on 100 mol % of the base material main ingredient. In some embodiments, the dielectric ceramic composition may include 0.001 mol % of the third accessory ingredient.

A content of the sixth accessory ingredient may be based on a content of at least one or more elements between Si and Al included in the sixth accessory ingredient without distinguishing a form of addition such as oxides or carbonates.

The sixth accessory ingredient may serve to decrease a sintering temperature and to improve high temperature breakdown voltage properties of the multilayer ceramic capacitor in which the dielectric ceramic composition is applied.

When a content of the sixth accessory ingredient exceeds 4.0 mol % based on 100 mol % of the base material main ingredient, the problems of degradation of sintering properties and density, creation of a secondary phase, and the like, may occur.

According to the example embodiment, as the dielectric ceramic composition includes 4.0 mol % or less of Al, grain growth may be uniformly controlled such that breakdown voltage properties and reliability may improve, and DC-bias may also improve.

In the description below, the present disclosure will be described in greater detail with reference to an embodiment and a comparative example, and the embodiment is provided to help understanding of the present disclosure, and a scope of example embodiments is not limited thereto.

EMBODIMENT

In an embodiment, to form a dielectric layer, a dielectric slurry was prepared by adding Dy, Gd, Al, Mg, Mn as additives, an organic solvent as a binder and ethanol to a dielectric raw material powder including barium titanate ($BaTiO_3$) powder, and performing a wet mixing process, and thereafter, a ceramic green sheet was prepared by coating a surface of a carrier film with the dielectric slurry and drying the coated slurry, and a dielectric layer was formed.

The contents of the additives of overall elements were mono-dispersed and added in 40 mol % or less based on barium titanate.

A total content of the rare earth elements added to the dielectric raw material powder including barium titanate ($BaTiO_3$) was 1.5 mol % based on 100 mol % of barium titanate, and 0.75 mol % of gadolinium (Gd) (embodiment 1) and 1.0 mol % of gadolinium (Gd) (embodiment 2) were included, respectively. In embodiment 1, 0.75 mol % of Dy, and 2.0 mol % of Al, 0.2 mol % of Mg, and 1.0 mol % of Mn are included. In embodiment 2, 0.5 mol % of Dy, and 2.0 mol % of Al, 0.2 mol % of Mg, and 1.0 mol % of Mn are included.

In embodiment 1, a content ratio of gadolinium (Gd) to dysprosium (Dy), Gd/Dy, was adjusted to be 1, and in embodiment 2, a content ratio of gadolinium (Gd) to dysprosium (Dy), Gd/Dy, was adjusted to be 2.

The ceramic green sheet was formed in a form of sheet having a certain thickness (μm) using slurry made from mixture of ceramic powder, binder, and solvent, and by performing a doctor blade method to the slurry.

An average size of a nickel particle was within a range of 0.1 to 0.2 μm, and a conductive paste for internal electrodes including nickel powder of 40 to 50 parts by weight was prepared.

The green sheet was coated with the conductive paste for internal electrodes through a screen printing process, the green sheets on which an internal electrode pattern is disposed was layered, and a laminate was formed. The laminate was compressed and cut out.

The binder was removed by heating the cut out laminate, and the laminate was sintered in a high temperature reducible atmosphere, thereby forming a ceramic body.

In the sintering process, a sintering process was performing for two hours at 1100 to 1200° C. in a reducible atmosphere (atmosphere of 0.1% $H_2$/99.9% $N_2$, $H_2O/H_2/N_2$), and a re-oxidation was performed for three hours in a nitrogen ($N_2$) atmosphere at 1000° C., and heat treatment was performed.

A termination process and an electrode sintering process were performed on the sintered ceramic body using a copper (Cu) paste, and external electrodes were prepared.

Thicknesses of the dielectric layer 111 and the first and second internal electrodes 121 and 122 in the ceramic body 110 were configured to be 0.4 μm or less after the sintering process.

Comparative Example 1

In comparative example 1, a composition of the dielectric ceramic composition is the same as a composition of the dielectric ceramic composition of the related art, and as a rare earth element, gadolinium (Gd) was not included, and only dysprosium (Dy) was included. The manufacturing processes may be the same as the processes described in the embodiment above.

Comparative Example 2

In comparative example 2, a total content of added rare earth elements was 1.5 mol % based on 100 mol % of barium titanate, similarly to the embodiment above, and 0.375 mol % of gadolinium (Gd) was included. Other manufacturing processes may be the same as the processes described in the embodiment above.

In comparative example 2, a content ratio of gadolinium (Gd) to dysprosium (Dy), Gd/Dy, was 33%.

A highly accelerated life test (HALT) was performed to embodiments 1 and 2, the samples of a proto-type multilayer ceramic capacitor (MLCC) manufactured as above, and to comparative examples 1 and 2 to assess a defect rate.

In the highly accelerated life test (HALT), forty multilayer ceramic capacitor chips were mounted on a substrate in each sample, and the defect rate was measured at 125° C. and under a voltage applying condition of 20 V (DC) for twelve hours.

FIG. 3 is a graph illustrating results of highly accelerated life test in an embodiment and in a comparative example.

Table 1 below shows electrical properties of the proto-type multilayer ceramic capacitor (MLCC) chips in experimental examples (embodiments 1 and 2, and comparative examples 1 and 2).

TABLE 1

|  | Number of Highly Accelerated Life Defects among Forty Samples |
| --- | --- |
| Comparative Example 1 | 9 |
| Comparative Example 2 | 8 |
| Embodiment 1 | 2 |
| Embodiment 2 | 0 |

Referring to FIGS. 3A to 3D and Table 1, in comparative example 1 (FIG. 3A), a composition of the dielectric ceramic composition was the same as a composition of the dielectric ceramic composition of the related art, and as rare earth elements, gadolinium (Gd) was not included, and only dysprosium (Dy) was included. The number of highly accelerated life defects was 9, which is relatively high.

In comparative example 2 (FIG. 3B), a total content of rare earth elements was 1.5 mol % based on 100 mol % of barium titanate, and 0.375 mol % of gadolinium (Gd) was included. The number of highly accelerated life defects was 8, which is relatively high.

In embodiment 1 (FIG. 3C) and in embodiment 2 (FIG. 3D), a content of gadolinium (Gd) was within the content range described in the example embodiment, and the number of highly accelerated life defects was 2 or 0, which is four times lower than the comparative examples. Thus, the reliability was improved.

According to the aforementioned example embodiment, the dielectric ceramic composition included in the dielectric layers in the ceramic body may include gadolinium (Gd), a new rare earth element, as an accessory ingredient, and a content of gadolinium (Gd) may be controlled such that reliability including breakdown voltage properties, insulating resistance, and the like, may improve.

While the example embodiments have been shown and described above, it will be apparent to those skilled in the art that modifications and variations could be made without departing from the scope of the present invention as defined by the appended claims.

What is claimed is:

1. A dielectric ceramic composition, comprising:
   a barium titanate-based base material main ingredient and an accessory ingredient,
   wherein the accessory ingredient includes dysprosium (Dy) and gadolinium (Gd) as first accessory ingredient elements,
   wherein a content ratio of gadolinium (Gd), based on a total content of the first accessory ingredient elements, is 25 mol % or higher,
   wherein the dielectric ceramic composition includes 0.1 to 2.0 mol of a second accessory ingredient comprising at least one element among Mn, V, Cr, Fe, Ni, Co, Cu, and Zn based on 100 mol of the base material main ingredient, 0.001 mol to 0.5 mol of a third accessory ingredient comprising Mg as a fixed-valence acceptor element based on 100 mol of the base material main ingredient, and 0.001 mol to 4.0 mol of a sixth accessory ingredient comprising Al.

2. The dielectric ceramic composition of claim 1, wherein a content ratio of gadolinium (Gd), based on a total content of the first accessory ingredient elements, is 50 mol % or higher.

3. The dielectric ceramic composition of claim 1, wherein the dielectric ceramic composition includes 0.001 mol to 4.15 mol of a fourth accessory ingredient comprising Ba based on 100 mol of the base material main ingredient.

4. The dielectric ceramic composition of claim 1, wherein the dielectric ceramic composition includes 0.001 mol to 20.0 mol of a fifth accessory ingredient comprising oxides or carbonates including at least one between Ca and Zr, based on 100 mol of the base material main ingredient.

5. The dielectric ceramic composition of claim 1, wherein a content ratio of gadolinium (Gd) to dysprosium (Dy), Gd/Dy, is 1 or higher.

6. A multilayer ceramic capacitor, comprising:
a ceramic body including a dielectric layer, and a first internal electrode and a second internal electrode opposing each other with the dielectric layer interposed therebetween; and a first external electrode disposed on an external side of the ceramic body and electrically connected to the first internal electrode, and a second external electrode disposed on an external side of the ceramic body and electrically connected to the second internal electrode,
wherein the dielectric layer includes a dielectric ceramic composition,
wherein the dielectric ceramic composition includes a barium titanate-based base material main ingredient and an accessory ingredient, and the accessory ingredient includes dysprosium (Dy) and gadolinium (Gd) as first accessory ingredient elements, and
wherein a content ratio of gadolinium (Gd), based on a total content of the first accessory ingredient elements, is 25 mol % or higher, and
wherein the dielectric ceramic composition includes 0.1 to 2.0 mol of a second accessory ingredient comprising at least one element among Mn, V, Cr, Fe, Ni, Co, Cu, and Zn based on 100 mol of the base material main ingredient, 0.001 mol to 0.5 mol of a third accessory ingredient comprising Mg as a fixed-valence acceptor element based on 100 mol of the base material main ingredient, and 0.001 mol to 4.0 mol of a sixth accessory ingredient comprising Al.

7. The multilayer ceramic capacitor of claim 6, wherein a content ratio of gadolinium (Gd), based on a total content of the first accessory ingredient elements, is 50 mol % or higher.

8. The multilayer ceramic capacitor of claim 6, wherein the dielectric ceramic composition includes 0.001 mol to 4.15 mol of a fourth accessory ingredient comprising Ba based on 100 mol of the base material main ingredient.

9. The multilayer ceramic capacitor of claim 6, wherein the dielectric ceramic composition includes 0.001 mol to 20.0 mol of a fifth accessory ingredient comprising oxides or carbonates including at least one between Ca and Zr, based on 100 mol of the base material main ingredient.

10. The multilayer ceramic capacitor of claim 6, wherein a content ratio of gadolinium (Gd) to dysprosium (Dy), Gd/Dy, is 1 or higher.

11. The multilayer ceramic capacitor of claim 6, wherein a thickness of the dielectric layer is 0.4 µm or less, and thicknesses of the first and second internal electrodes are 0.4 µm or less.

* * * * *